(12) United States Patent
De Domenico et al.

(10) Patent No.: US 12,518,493 B2
(45) Date of Patent: Jan. 6, 2026

(54) REAL-TIME GATEWAY BETWEEN A VIRTUAL ENVIRONMENT AND A REAL ENVIRONMENT

(71) Applicant: ATOS France, Bezons (FR)

(72) Inventors: Julien De Domenico, Saint Beauzire (FR); Loïck Chiron, Clermont-Ferrand (FR); Hasan Sütyemez, Terrasson-Lavilledieu (FR); Gabriel Morin, Franconville (FR)

(73) Assignee: ATOS FRANCE, Bezons (FR)

( * ) Notice: Subject to any disclaimer, the term of this patent is extended or adjusted under 35 U.S.C. 154(b) by 167 days.

(21) Appl. No.: 18/376,542

(22) Filed: Oct. 4, 2023

(65) Prior Publication Data

US 2024/0112423 A1  Apr. 4, 2024

(30) Foreign Application Priority Data

Oct. 4, 2022 (EP) .................................... 22306478

(51) Int. Cl.
*G06T 19/00* (2011.01)
*G06T 7/73* (2017.01)

(52) U.S. Cl.
CPC ............. *G06T 19/006* (2013.01); *G06T 7/74* (2017.01); *G06T 2207/30204* (2013.01)

(58) Field of Classification Search
None
See application file for complete search history.

(56) References Cited

U.S. PATENT DOCUMENTS

| 2005/0159916 A1* | 7/2005 | Anabuki | G06T 15/20 |
| | | | 702/151 |
| 2014/0247279 A1* | 9/2014 | Nicholas | G06F 3/011 |
| | | | 345/633 |
| 2016/0163107 A1* | 6/2016 | Chen | G01B 11/24 |
| | | | 345/419 |
| 2018/0218538 A1* | 8/2018 | Short | G06V 20/20 |

(Continued)

FOREIGN PATENT DOCUMENTS

WO  WO-2017198331 A1 * 11/2017  ........... G06T 19/006

OTHER PUBLICATIONS

Translation for WO-2017-198331.*
European Search Report for corresponding EP Application No. 22306479.3 dated Mar. 6, 2023.

*Primary Examiner* — Ryan M Gray
(74) *Attorney, Agent, or Firm* — Meagher Emanuel Laks Goldberg & Liao, LLP

(57) ABSTRACT

A method for integrating in real time at least one virtual object (41, 42, 43, 44) into a video stream generated by a user equipment (20) and representing a real environment (RE), comprising the steps of calculating (C3) the so-called "real" position, in the real environment (RE), of a representation of the at least one virtual object (41, 42, 43, 44) relative to a predetermined reference position corresponding, in the real environment (RE), to the position of the virtual marker (30) in the virtual environment (VE), of integrating (U2) the representation of the at least one virtual object (41, 42, 43, 44) in a video stream generated at the calculated real position, and of displaying (U3) of the video stream so that said representation appears in real time on the images of the video stream generated at the calculated real position.

12 Claims, 5 Drawing Sheets

(56) References Cited

U.S. PATENT DOCUMENTS

Figure 1:
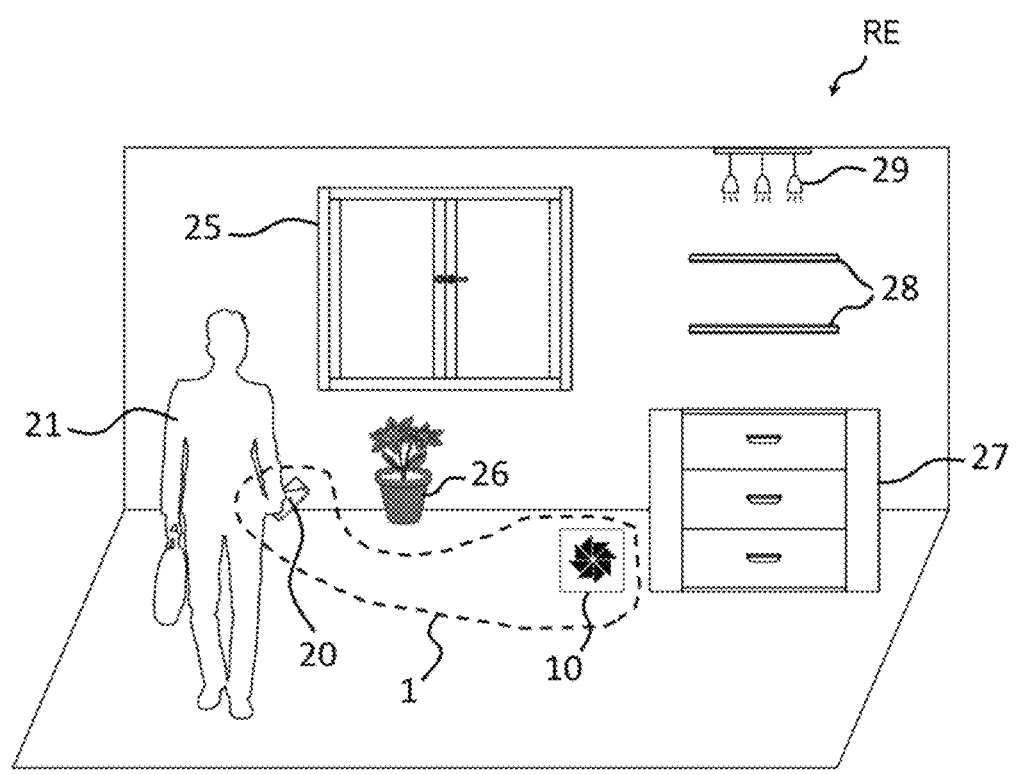

| | | | |
|---|---|---|---|
| 2018/0293798 A1* | 10/2018 | Energin | G06F 9/445 |
| 2018/0321776 A1* | 11/2018 | Averyanov | G06F 3/048 |
| 2019/0172266 A1 | 6/2019 | Short et al. | |
| 2019/0251747 A1 | 8/2019 | Yin et al. | |
| 2020/0134927 A1* | 4/2020 | Huang | G02B 30/22 |
| 2021/0043005 A1* | 2/2021 | Arora | G06F 3/012 |
| 2024/0112423 A1* | 4/2024 | De Domenico | G06T 19/006 |
| 2024/0386682 A1* | 11/2024 | Cvetko | G06T 19/006 |
| 2025/0104369 A1* | 3/2025 | Naka | G06T 7/0004 |

\* cited by examiner

REAL-TIME GATEWAY BETWEEN A VIRTUAL ENVIRONMENT AND A REAL ENVIRONMENT

TECHNICAL FIELD

The present invention relates to the field of augmented reality and more particularly relates to a method for integrating in real time at least one virtual object into a video stream generated by a user equipment as well as to such user equipment.

PRIOR ART

Nowadays, it is known to use computer applications for smartphones or computers that allow you to add objects to images and thus obtain an augmented reality view.

Certain known applications make it possible to cut out a photo of an object and insert the object thus cut out in the form of a 2D element in a page or an image.

Other applications make it possible to scan the real environment with a camera, for example that of a smartphone, to obtain an extended image of the real scene, then to integrate predefined 3D elements available in a digital library into said image.

A disadvantage of these solutions lies in the fact that the objects or elements integrated into the images are static. Thus, the user cannot view a real scene from different angles without having to reposition objects.

There is therefore a need for a simple and effective solution making it possible to at least partially remedy these drawbacks.

DISCLOSURE OF THE INVENTION

To this end, the invention firstly relates to a method for integrating in real time at least one virtual object into a video stream generated by user equipment and representing a real environment, said virtual object being defined in a virtual environment and being characterized by its so-called "virtual" position, said virtual position being defined in relation to a virtual marker placed in said virtual environment, said method comprising the steps, implemented by said user equipment, of:

calculating the so-called "real" position, in the real environment, of a representation of the at least one virtual object relative to a predetermined reference position corresponding, in the real environment, to the position of the virtual marker in the virtual environment, integrating the representation of the at least one virtual object in a video stream generated at the calculated real position, displaying the video stream so that said representation appears in real time on the images of the video stream generated at the calculated real position.

The virtual marker corresponds to the origin of a three-dimensional spatial reference system in the virtual environment while the predetermined reference position corresponds to the origin of a three-dimensional spatial reference system in the real environment. The virtual marker thus makes it possible to define a virtual reference system associated with a real reference system defined in relation to the predetermined reference position, which allows both to establish a continuous bridge (i.e. in real time) between the virtual environment and the real environment and obtain significant precision in the placement of representations of virtual objects in the images of the video stream of the real scene. In particular, the integration of the representation of virtual objects in the real-time video stream makes it possible to display the real scene in dynamic augmented reality, that is to say that the user's movements are taken into account to place virtual objects on the images of the video stream at each moment and not just statically on an image.

In order to display the real scene comprising the representation of the virtual object(s), the user equipment can be equipped with an existing augmented reality application such as, for example, the ARCore® application from Google®. By augmented reality, we mean the superposition of elements on images representing a real scene.

Advantageously, the method can be implemented with several generated virtual environments (i.e. several virtual scenes) for several real environments (for example several rooms of a house, several stores, etc.) in order to allow the user of the user equipment to add virtual objects adapted to each real environment.

According to one aspect of the invention, the method comprises a preliminary phase comprising the steps of:

generating a 3D model representing the virtual environment, placing a virtual marker in the generated virtual environment, placing a real marker in the real environment at the location corresponding to that of the virtual marker in the virtual environment, generating at least one image of the real environment corresponding to the virtual environment and including the real marker, detecting a pattern corresponding to at least part of the real marker in the at least one image generated in order to locate the real marker, the pattern being predefined in the application, determining the position of the detected pattern as being the reference position of the real environment.

The detection of a pattern corresponding to at least part of the real marker in the image taken makes it possible to know where the user is located in the real environment, in relation to the real marker, to subsequently be able to dynamically integrate the virtual environment 3D objects in the video stream.

The marker must be visible for the preliminary phase of determining the actual reference position. Multiple markers can be used to ensure precision over large areas.

The real marker can for example be an object, preferably with multiple angular shapes allowing the creation of multiple reference points for recognition.

The real marker may for example be a label or a poster identifiable by the user equipment on the images of the video stream.

Preferably, the real marker is black and white in order to maximize the contrast and thus make it easier to spot by filtering the light and possibly removing objects in front of the real marker.

In one embodiment, the method includes a step of meshing the space by automatically creating additional markers from the initial real marker in order to make it possible to manage stability problems due to a too great distance from a single real marker. Indeed, a drift in the position of a single real marker could occur, for example of the order of 20 cm for 4 to 5 meters of distance, which would degrade the rendering of augmented reality.

Advantageously, the generation of the virtual environment is carried out via a dedicated application, preferably installed on the user equipment, or by scanning the real environment to virtualize it, preferably via the user equipment.

According to another aspect of the invention, the method comprises a design phase comprising the arrangement of the virtual scene generated by the addition of one or more virtual objects.

In one embodiment, the method comprises obtaining at least one piece of data relating to at least one real or virtual object and displaying the at least one piece of data with the representation of the real or virtual object in the video stream, for example superimposed or adjacent. The at least one piece of data relating to at least one object can be obtained in a database or received from the object itself. For example, the price of an item, real or virtual, may be displayed on or next to the item in the images of the video stream. For example again, in the case of a real connected object, the at least one piece of data can be sent by the connected object to the user equipment and displayed by the user equipment on the images of the video stream.

In one embodiment, the method comprises detecting a real object added or moved in the real environment, determining the actual position of the real object added or moved relative to a predetermined reference position in the real environment corresponding in the real environment to the virtual marker of the virtual environment, determining the virtual position corresponding, in the virtual environment, to the determined real position, modeling the virtual object from the real object (if the object was added and/or was not modeled) and integrating the modeled virtual object into the virtual environment at the determined virtual position.

Preferably, the detection of the real object added or moved in the real environment is carried out using an artificial intelligence module to link the object to a pre-existing 3D object model in the 3D environment model, or a code on the object, or by scanning the object to create the virtual model of the object or by any existing method (for example using pixel recognition).

In one embodiment, obtaining the position of the real object added or moved is carried out using a geolocation module or by creating a new reference. Geolocation can for example be satellite geolocation (GPS or other system). Geolocation can for example be based on spatial anchoring in a world reference system. Geolocation can be of the indoor geolocation type (beacon, wifi, RFID or any type of network via waves). Geolocation can for example be based on new markers. Geolocation can, for example, be based on computer vision.

The invention also relates to a computer program product characterized in that it includes a set of program code instructions which, when executed by one or more processors, configure the processor(s) to implement a process as presented above.

The invention also relates to user equipment for the real-time integration of at least one virtual object into a video stream generated by said user equipment and representing a real environment, said virtual object being defined in a virtual environment and being characterized by its so-called "virtual" position, said virtual position being defined in relation to a virtual marker placed in said virtual environment, the user equipment being configured to:
  calculate the so-called "real" position, in the real environment, of a representation of the at least one virtual object relative to a predetermined reference position corresponding, in the real environment, to the position of the virtual marker in the virtual environment,
  integrate the representation of the at least one virtual object into a video stream generated at the calculated real position,
  display the video stream so that said representation appears in real time on the images of the video stream generated at the real calculated position.

In one embodiment, the user equipment is configured to calculate or receive the virtual position of the at least one virtual object.

According to one aspect of the invention, the user equipment is configured to, in a preliminary phase:
  generate a 3D model representing the virtual environment,
  place a virtual marker in the generated virtual environment,
  generate at least one image of the real environment corresponding to the virtual environment and comprising a real marker at the location corresponding to that of the virtual marker in the virtual environment,
  detect a pattern corresponding to at least part of the real marker in the at least one image generated in order to locate the real marker, the pattern being predefined in the application,
  determine the position of the detected pattern as being the reference position of the real environment.

Advantageously, the user equipment comprises a dedicated application configured to generate the virtual environment and/or is configured to generate the virtual environment via a scan of the corresponding real environment.

Advantageously still, the user equipment is configured to receive at least one piece of data relating to at least one real or virtual object and to display the at least one piece of data with the representation of the virtual object in the video stream, for example superimposed or adjacent. The at least one piece of data relating to at least one object can be obtained in a database or received from the object itself. For example, the price of an object, real or virtual, may be displayed on or next to the object in the images of the video stream. For example again, in the case of a real connected object, the at least one piece of data can be sent by the connected object to the user equipment and displayed by the user equipment on the images of the video stream.

In one embodiment, the user equipment is configured to detect an added or moved real object in the real environment, to determine the actual position of the added or moved real object relative to a predetermined reference position in the real environment corresponding to the virtual marker of the virtual environment, to determine the virtual position corresponding, in the virtual environment, to the determined real position, to model the virtual object from the real object and to integrate the virtual object modeled in the virtual environment at the determined virtual position.

Preferably, the user equipment is configured to detect the real object added or moved in the real environment using an artificial intelligence module to link the object to a pre-existing 3D object model in the 3D model environment, or by reading a code on the object (for example a QR code) or by scanning the object to create the virtual model of the object or by any existing method (for example using pixel recognition).

In one embodiment, the user equipment is configured to obtain the position of the real object added or moved by a geolocation module or by the creation of a new marker. Geolocation can for example be based on spatial anchoring in a world reference system. Geolocation can be indoor geolocation (beacon, wifi, RFID or any type of wave network). Geolocation can for example be based on new markers. Geolocation can, for example, be based on computer vision.

Advantageously, the user equipment is configured to create a mesh of the space by automatically creating additional markers from the initial real marker in order to make it possible to manage stability problems due to a too great distance from a marker. unique real.

The invention also relates to an augmented reality system comprising at least one real marker arranged in a real environment and user equipment as presented above.

The invention also relates to a method for integrating in real time at least one virtual object into a virtual environment from a video stream generated by user equipment and representing a real environment corresponding to said virtual environment, said object virtual being characterized in the virtual environment by its so-called "virtual" position, said virtual position being defined in relation to a virtual marker placed in said virtual environment, said method comprising the steps, implemented by said user equipment, of:
  detection of a real object added or moved in the real environment,
  determination of the real position of the real object added or moved relative to a predetermined reference position corresponding in the real environment to the virtual marker of the virtual environment,
  determination of the virtual position corresponding, in the virtual environment, to the determined real position,
  modeling of the virtual object from the real object if the object was added and/or was not modeled,
  integration of the modeled virtual object into the virtual environment at the determined virtual position.

This method according to the invention makes it possible to create a digital twin of the real environment and to enrich it according to changes in said real environment.

Preferably, the detection of the real object added or moved in the real environment is carried out using an artificial intelligence module to link the object to a pre-existing 3D object model in the 3D environment model, or a code on the object, or by scanning the object to create the virtual model of the object or by any existing method (for example using pixel recognition).

In one embodiment, obtaining the position of the real object added or moved is carried out by a geolocation module or by the creation of a new marker. Geolocation can for example be based on spatial anchoring in a world reference system. Geolocation can be indoor geolocation (beacon, wifi, RFID or any type of wave network). Geolocation can for example be based on new markers. Geolocation can, for example, be based on computer vision.

In one embodiment, the method includes a step of meshing the space by automatically creating additional markers from the initial real marker in order to make it possible to manage stability problems due to too great a distance from a single real marker. Indeed, a drift in the position of a single real marker could occur, for example of the order of 20 cm for 4 to 5 meters of distance, which would degrade the rendering of augmented reality.

According to one aspect of the invention, the method comprises a preliminary phase comprising the steps of:
  generation of a 3D model representing the virtual environment,
  placement of a virtual marker in the generated virtual environment,
  placement of a real marker in the real environment at the location corresponding to that of the virtual marker in the virtual environment,
  generation of at least one image of the real environment corresponding to the virtual environment and including the real marker,
  detection of a pattern corresponding to at least part of the real marker in the at least one image generated in order to locate the real marker, the pattern being predefined in the application,
  determination of the position of the detected pattern as being the reference position of the real environment.

The detection of a pattern corresponding to at least part of the real marker in the image taken makes it possible to know where the user is located in the real environment, in relation to the real marker, to subsequently be able to dynamically integrate the 3D objects of the virtual environment in the video stream.

The real marker can for example be an object, preferably with multiple angular shapes, or a label identifiable by the user equipment on the images of the video stream.

Advantageously, the generation of the virtual environment is carried out via a dedicated application, preferably installed on the user equipment, or by scanning the real environment to virtualize it, preferably via the user equipment.

According to another aspect of the invention, the method comprises a design phase comprising the arrangement of the virtual scene generated by the addition of one or more virtual objects.

The invention also relates to a computer program product characterized in that it includes a set of program code instructions which, when executed by one or more processors, configure the processor(s) to implement a process as presented above.

The invention also relates to user equipment for the real-time integration of at least one virtual object into a virtual environment from a video stream generated by said user equipment and representing a real environment corresponding to said virtual environment, said virtual object being characterized in the virtual environment by its so-called "virtual" position, said virtual position being defined in relation to a virtual marker placed in said virtual environment, the user equipment being configured to:
  detect a real object added or moved in the real environment,
  determine the real position of the real object added or moved relative to a predetermined reference position corresponding in the real environment to the virtual marker of the virtual environment,
  determine the virtual position corresponding, in the virtual environment, to the determined real position,
  model the virtual object from the real object if the object was added and/or was not modeled,
  integrate the modeled virtual object into the virtual environment at the determined virtual position.

Preferably, the user equipment is configured to detect the real object added or moved in the real environment using an artificial intelligence module to link the object to a preexisting 3D object model in the 3D model environment, or a code on the object, or by scanning the object to create the virtual model of the object or by any existing method (for example using pixel recognition).

In one embodiment, the user equipment is configured to obtain the position of the real object added or moved by a geolocation module or by the creation of a new marker. Geolocation can for example be based on spatial anchoring in a world reference system. Geolocation can be indoor geolocation (beacon, wifi, RFID or any type of wave network). Geolocation can for example be based on new markers. Geolocation can, for example, be based on computer vision.

In one embodiment, the user equipment is configured to mesh the space by automatically creating additional markers from the initial real marker in order to manage stability problems due to too great a distance. a unique real marker.

According to one aspect of the invention, the user equipment is configured to, in a preliminary phase:
- generate a 3D model representing the virtual environment,
- place a virtual marker in the generated virtual environment,
- generate at least one image of the real environment corresponding to the virtual environment and comprising a real marker at the location corresponding to that of the virtual marker in the virtual environment,
- detect a pattern corresponding to at least part of the real marker in the at least one image generated in order to locate the real marker, the pattern being predefined in the application,
- determine the position of the detected pattern as being the reference position of the real environment.

Advantageously, the user equipment comprises a dedicated application configured to generate the virtual environment and/or is configured to generate the virtual environment via a scan of the corresponding real environment.

The invention also relates to an augmented reality system comprising at least one real marker arranged in a real environment and user equipment as presented above.

The invention also relates to an augmented reality system comprising at least one real marker arranged in a real environment and user equipment as presented above.

DESCRIPTION OF THE DESIGN

Other characteristics and advantages of the invention will become apparent on reading the description which follows. This is purely illustrative and must be read in conjunction with the appended drawings in which:

FIG. 1 schematically illustrates an example of a real environment comprising an embodiment of the system according to the invention.

Figure 2:
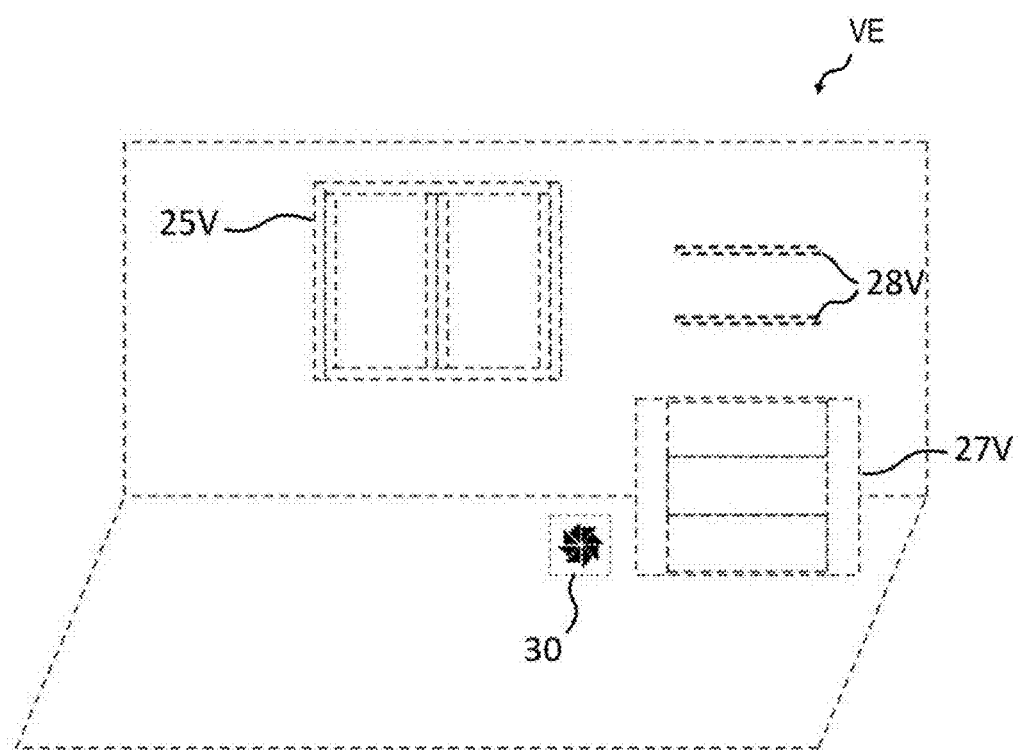

FIG. 2 schematically illustrates an example of a virtual environment corresponding to the real environment of FIG. 1.

Figure 3:
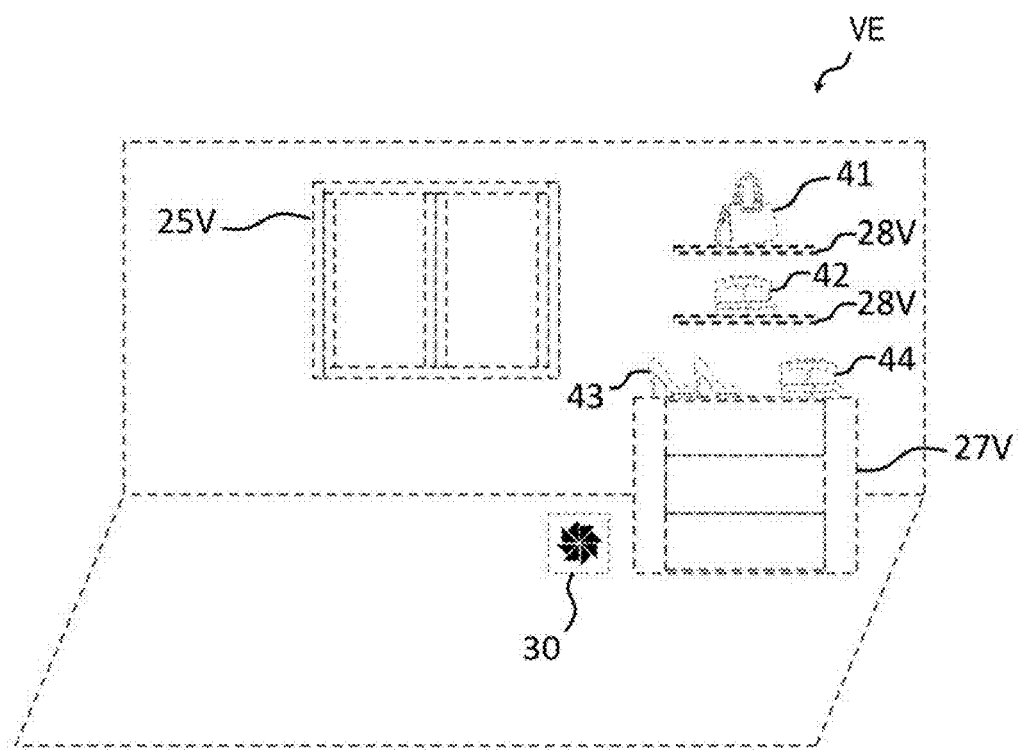

FIG. 3 schematically illustrates the virtual environment of FIG. 2 in which virtual objects have been added.

Figure 4:
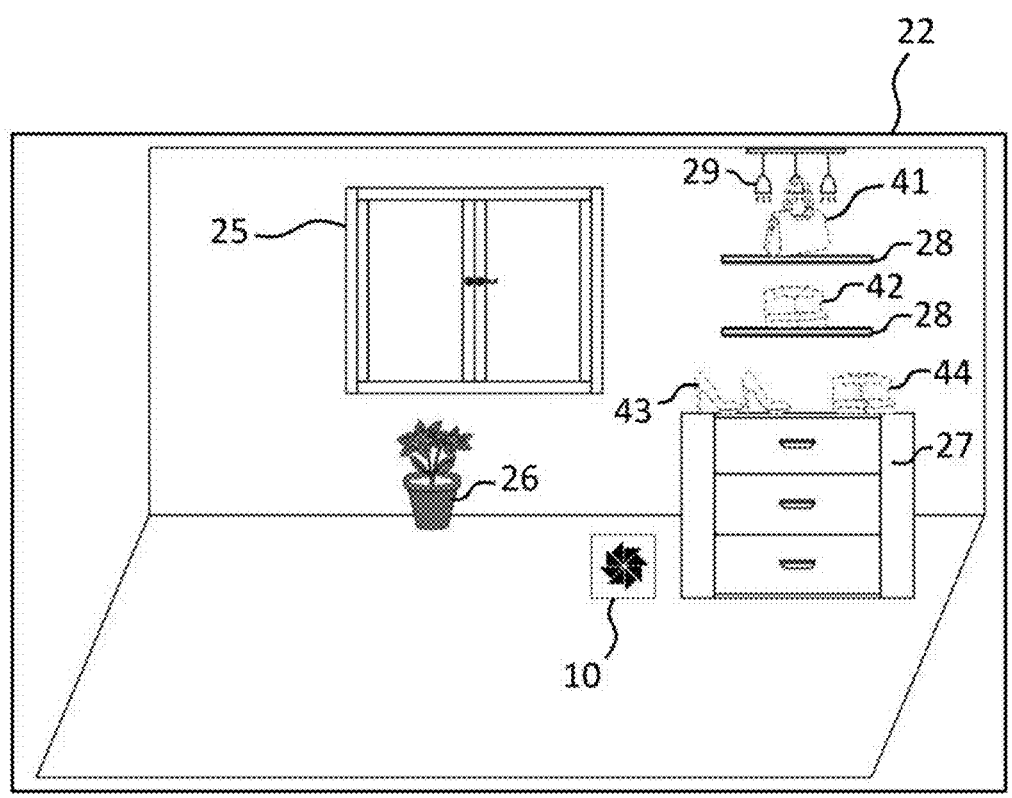

FIG. 4 schematically illustrates an example image of a video stream generated according to the invention and representing the real environment augmented with virtual objects.

Figure 5:
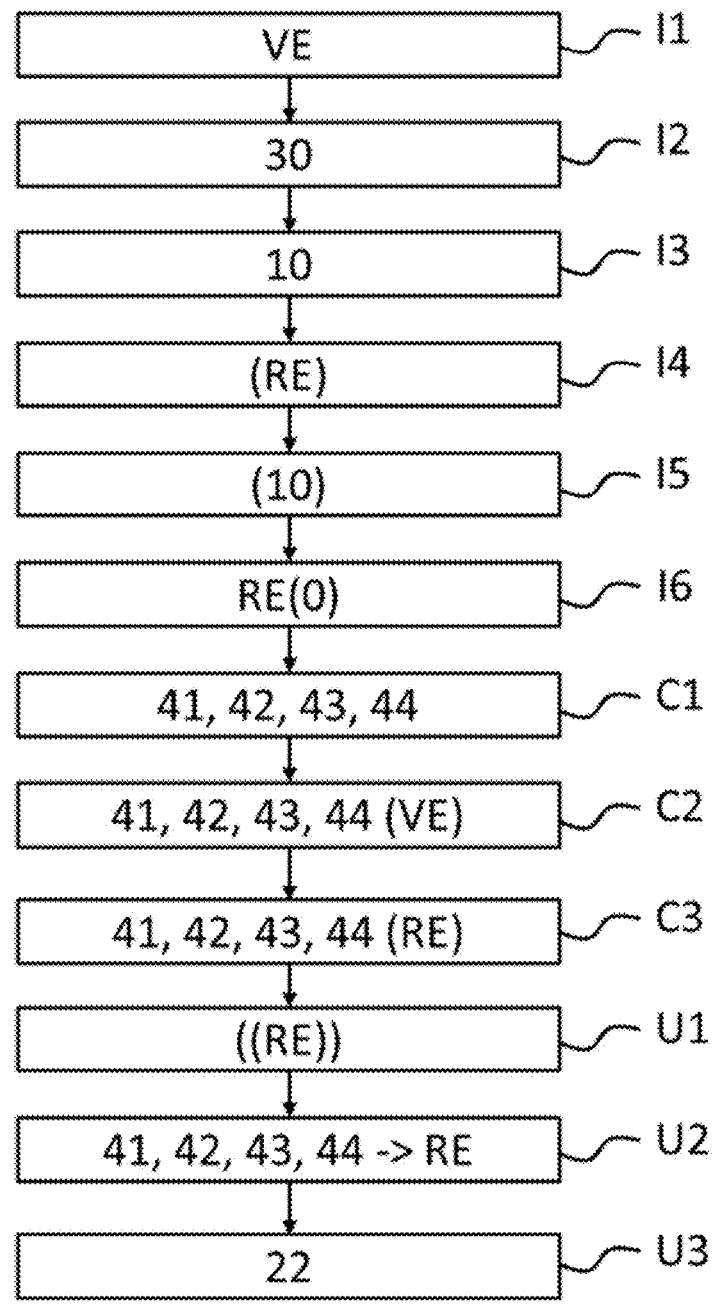

FIG. 5 schematically illustrates an embodiment of the method according to the invention.

DESCRIPTION OF THE EMBODIMENTS

FIG. 1 represents an example of a real environment RE comprising an embodiment of system 1 according to the invention.

System 1

The system 1 comprises a real marker 10 and user equipment 20 placed in a real environment RE which can be interior (room, interior space, etc.) or exterior (garden, street, etc.). In this example, the user equipment 20 is a smartphone carried by a user 21.

Still in this example, the real environment RE is a room comprising real objects such as window 25, flower pot 26, chest of drawers 27, shelves 28, lamps 29.

Real Marker 10

The real marker 10 is a remarkable element placed in the real environment RE and having characteristics easily identifiable on images of a video stream.

For example, the real marker 10 can be in the form of an object or a label, in particular a tag. In the case of an object, the real marker 10 preferably comprises a plurality of angular shapes in order to identify it more easily in a video stream of the environment in which it is located, in particular among various objects.

Preferably, the real marker 10 is, essentially, black and white in order to maximize the contrast and thus make it easier to spot by filtering the light and possibly removing objects in front of the real marker 10.

In the example of FIG. 1, the real marker 10 is in the form of a panel on which a black windmill is schematically drawn on a white background.

User Equipment 20

The user equipment 20 can be of the smartphone type, tablet, connected glasses, laptop or any other equipment adapted and configured to implement the functions of the invention. The user equipment 20 notably comprises at least one camera and a display screen 22 (FIG. 4).

The user equipment 20 is configured to generate a video stream representing the real environment RE. In other words, the user equipment 20 is configured to generate a sequence of images of the real environment RE.

Preferably, the user equipment 20 is configured to generate a 3D model of virtual environment VE. In order to generate the 3D model representing the virtual environment VE, the user equipment 20 may include a dedicated application, known per se. Alternatively or in addition, the user equipment 20 can be configured to generate the virtual environment VE by scanning the corresponding real environment RE so as to obtain a video stream which is then virtualized into 3D shapes.

Alternatively or in addition, the 3D model of virtual environment VE can be generated on remote equipment, for example a computer or a tablet, then sent to the user equipment 20.

The virtual environment VE represents a 3D virtual scene (FIG. 2) corresponding to a real scene of the real environment RE (FIG. 1). The virtual scene can partially or completely represent the real scene. For example, the virtual scene can represent a room in a building or house, as illustrated in FIG. 2, part of a factory or warehouse, an outdoor space, etc. In the example of virtual environment VE in FIG. 2, only the virtual representations of the 25V window, the 27V chest of drawers and the 28V shelves were generated but no virtual representations of the flower pot 26 and the lamps 29 were generated, these having been judged to be unnecessary details.

Still with reference to FIG. 2, the user equipment 20 is configured to place at least one virtual marker 30 in the generated virtual environment VE or to allow the placement of at least one virtual marker 30 in the virtual environment VE generated. The virtual marker 30 constitutes a reference in the virtual environment VE from which the position of the virtual objects of the virtual environment VE, called "virtual position", can be defined and from which said virtual objects can be positioned in the VE virtual environment. In other words, the position of the virtual marker 30 constitutes the origin of a "virtual" three-dimensional spatial reference system defined in the virtual environment VE. The virtual position of each virtual object can be defined in the virtual three-dimensional spatial reference system using coordinates or any suitable means. The virtual marker 30 can for example be in the form of a 3D modeling of a 2D marker, a textured object, its mesh or its cloud of points.

In the example of FIG. 3, virtual objects, which are to be integrated into the video stream, are inserted into the virtual environment VE: a handbag 41 placed on the virtual representation 28V of the upper shelf 28, a stack of blouses 42 placed on the virtual representation 28V of the lower shelf 28, a pair of shoes 43 placed on the left part of the upper face of the virtual representation 27V of the chest of drawers 27 and a stack of shirts 44 placed on the part left of the upper face of the virtual representation 27V of the chest of drawers 27.

Several virtual environments VE can be generated in parallel so that the user 21 can navigate from one to the other, each comprising its own virtual marker 30 and its own virtual objects 30. In this case, each corresponding real environment RE includes at least one real marker 10.

The user equipment 20 is configured to generate at least one image of the real environment RE corresponding to the virtual environment VE and comprising the real marker 10 at the location corresponding to that of the virtual marker 30 in the virtual environment VE.

The user equipment 20 is configured to detect a pattern corresponding to at least a part of the real marker 10 (or to the real marker 10 in its entirety) in the at least one image generated in order to locate said real marker 10. The pattern is predefined and stored in a memory area of the user equipment 20.

The user equipment 20 is configured to determine the position of the pattern detected in the at least one image and define said determined position as being the reference position of the real environment RE in the images of the video stream representing said real environment RE. The reference position thus determined constitutes the origin of a "real" three-dimensional spatial reference system defined in the real environment RE, which is the equivalent of the three-dimensional spatial reference system defined in the virtual environment VE. The real position corresponding to the virtual position of each virtual object can be defined in the real three-dimensional spatial reference system using coordinates or any suitable means.

In one embodiment, the user equipment 20 is configured to place the virtual objects to be integrated into the video stream (handbag 41, stack of blouses 42, pair of shoes 43 and a stack of shirts 44) in the virtual environment VE generated and/or to allow the placement, in particular by the user 21 of the user equipment 20, of virtual objects in the virtual environment VE. The position of each virtual object 41, 42, 43, 44 can be determined or calculated in the virtual environment VE by the user equipment 20. Alternatively or in addition, the position of each virtual object 41, 42, 43, 44 can be received, either from other equipment or from an application embedded on the user equipment 20 allowing the placement of the virtual objects 41, 42, 43, 44 and determining their position in the virtual environment VE.

The user equipment 20 is configured to calculate, in the real environment RE, a so-called "real" position defined in relation to the predetermined reference position and corresponding in the real environment RE to the virtual position of each virtual object 41, 42, 43, 44.

The user equipment 20 is configured to integrate a representation of each virtual object 41, 42, 43, 44 in real time in the generated video stream, representing the real environment RE, at the real position calculated for said virtual object 41, 42, 43, 44.

The user equipment 20 is configured to display the images of said video stream so that the representation of the virtual objects 41, 42, 43, 44 appears in real time on the screen 22 of the user equipment 20, i.e., while he films the actual scene.

Advantageously, the user equipment 20 is configured to recalculate the position of the virtual objects 41, 42, 43, 44 periodically, preferably continuously (for example at least once per second, or even on the order of 10 to 100 times per second) and in real time in order to permanently position the virtual objects 41, 42, 43, 44 in the images of the video stream with significant precision.

In one embodiment, with reference to FIG. 4, the user equipment 20 is configured to detect a real object 25, 26, 27, 28, 29 added or moved in the real environment RE using an artificial intelligence module (not shown) making it possible to link the real object 25, 26, 27, 28, 29 to a pre-existing 3D object model in the 3D virtual environment model VE.

Alternatively or in addition, the user equipment 20 is configured to detect a real object 25, 26, 27, 28, 29 added or moved in the real environment RE using a code placed on the object, for example of QR code type.

Alternatively or in addition, the user equipment 20 is configured to detect a real object 25, 26, 27, 28, 29 added or moved in the real environment RE by scanning said real object 25, 26, 27, 28, 29 in order to create the 3D model of the real object 25, 26, 27, 28, 29.

The user equipment 20 is configured to determine the actual position of the real object 25, 26, 27, 28, 29 added or moved in the real environment RE, relative to the predetermined reference position, using the images from the video stream.

In one embodiment, the user equipment 20 is configured to obtain the position of the real object 25, 26, 27, 28, 29 added or moved via a geolocation module. The geolocation can for example be based on a satellite system (GPS or other) or spatial anchoring in a world reference system. Geolocation can be indoor geolocation (beacon, wifi, RFID or any type of wave network). Alternatively or in addition, the user equipment 20 is configured to obtain the position of the real object 25, 26, 27, 28, 29 added or moved by creating a new marker. Geolocation can for example be based on new markers. Alternatively or in addition, the user equipment 20 is configured to obtain the position of the real object 25, 26, 27, 28, 29 added or moved based on computer vision.

The user equipment includes a processor capable of implementing a set of instructions allowing these functions to be performed. The functions of the invention can be grouped in one or more applications installed on the user equipment 20.

The user equipment 20 can be configured to implement only the link from the virtual environment VE to the real environment RE (integration of virtual objects into the real-time video stream) or only the link of the real environment RE to the virtual environment VE (adding or moving a real object in the real environment RE and updating the corresponding virtual environment VE in real time) or both the environment link virtual VE to the real environment RE and the link from the real environment RE to the virtual environment VE (in turn or simultaneously).

Implementation Example

The method according to the invention requires an initialization phase PI making it possible in particular to define the virtual environment VE and its reference system, the real environment RE and its reference system as well as their common link in the images of the video stream.

First of all, with reference to FIG. 5, in a step I1, the user equipment 20 generates (or receives) a 3D model of virtual environment VE representing a 3D virtual scene (FIG. 2) corresponding to a scene real environment RE (FIG. 1). By the term "corresponding", it is understood here, as indicated previously, that the virtual scene represents at least in part the real scene, without necessarily all the details of the real scene being reproduced in the virtual scene.

In a step I2, with reference to FIG. 2, a virtual marker 30 is placed in the virtual environment VE in order to constitute the origin of a three-dimensional spatial reference system making it possible to determine the position of virtual objects 41, 42, 43, 44 in said virtual environment VE. For example, the virtual marker 30 can be placed by the user 21 of the user equipment 20 via said user equipment 20, preferably visually via the screen 22 of the user equipment 20.

In a step I3, a real marker 10 is placed in the real environment RE corresponding to the virtual environment VE, at the location corresponding to that of the virtual marker 30 in the virtual environment VE, as illustrated in FIG. 1.

In a step I4, the user equipment 20 generates at least one image of the real environment RE.

In a step I5, the user equipment 20 detects a pattern corresponding to at least part of the real marker 10 in the at least one image generated, the pattern being preferably predefined in the user equipment 20.

In a step I6, the user equipment 20 determines the position of the detected pattern as being the reference position RE(0) of the real environment RE.

The method according to the invention then requires a PC design phase.

In a step C1 a designer or the user 21 of the user equipment 20 arranges the virtual scene by adding virtual objects 41, 42, 43, 44.

In a step C2, the user equipment 20 determines the virtual position of each virtual object 41, 42, 43, 44 in the virtual environment VE with respect to the virtual marker 30. In the case where the arrangement was carried out by a designer via an application which is outside the user equipment 20, the user equipment 20 can receive the position of the virtual objects 41, 42, 43, 44 (coordinates) or receive the arrangement and determine the position of the virtual objects 41, 42, 43, 44 (coordinates).

In a step C3, the user equipment 20 calculates (or receives) the real position corresponding to the position of each virtual object 41, 42, 43, 44, defined in relation to the reference position RE(0) predetermined in the real RE environment.

Then, in a use phase PU, the user equipment 20 generates in a step U1 a video stream comprising images representing the real environment RE then integrates in a step U2 a representation of each virtual object 41, 42, 43, 44 to the real position calculated in the images of the generated video stream. It goes without saying that only the representations of virtual objects 41, 42, 43, 44 located in an area represented on the images can appear on said images.

The user equipment 20 displays on its screen 22 in real time, in a step U3, the video stream comprising the representations of the virtual objects 41, 42, 43, 44 integrated.

In one embodiment, the method comprises obtaining at least one piece of data relating to at least one real or virtual object and displaying at least one piece of data with the representation of the virtual object 41, 42, 43, 44 in the video stream, for example in a superimposed or adjacent manner. The at least one piece of data relating to at least one object can be obtained in a database or received from the object itself. For example, the price of an object, real or virtual, may be displayed on or next to the object in the images of the video stream. For example, one or more real objects may be connected objects and the method may comprise the sending by each real object connected to the user equipment 20 of at least one piece of data and the display by said user equipment 20, during step U3, at least one piece of data with the representation of the virtual object 41, 42, 43, 44 in the video stream, for example superimposed or next to the connected object.

With the invention, the user can thus visualize in real time the augmented real scene of the 3D objects, these being advantageously permanently positioned precisely in relation to the predetermined reference position.

What is claimed is:

1. A method for integrating in real time at least one virtual object (41, 42, 43, 44) into a video stream generated by a user equipment (20) and representing a real environment (RE), said virtual object (41, 42, 43, 44) being defined in a virtual environment (VE) and being characterized by its so-called "virtual" position, said virtual position being defined in relation to a virtual marker (30) placed in said virtual environment (VE), said method implemented by said user equipment (20), said method comprising:

in a preliminary phase:
  generating (I1) a 3D model representing the virtual environment (VE),
  placing (I2) a virtual marker (30) in the generated virtual environment (VE),
  placing (I3) a real marker (10) in the real environment (RE) at the location corresponding to that of the virtual marker (30) in the virtual environment (VE),
  generating (I4) at least one image of the real environment (RE) corresponding to the virtual environment (VE) and including the real marker (10),
  detecting (I5) a pattern corresponding to at least part of the real marker (10) in the at least one image generated in order to locate the real marker (10), the pattern being predefined in the application,
  determining (I6) the position of the detected pattern as being the reference position of the real environment (RE), and
  mapping of the real environment (ER) by automatically creating additional markers from the real marker (10), said method further comprising:
  calculating (C3) the so-called "real" position, in the real environment (RE), of a representation of the at least one virtual object (41, 42, 43, 44) relative to the predetermined reference position of the real environment (RE) corresponding, in the real environment (RE), to the position of the virtual marker (30) in the virtual environment (VE),
  integrating (U2) the representation of the at least one virtual object (41, 42, 43, 44) in a video stream generated at the calculated real position,
  displaying (U3) the video stream so that said representation appears in real time on images of the video stream generated at the calculated real position.

2. The method according to claim 1, wherein the generation of the virtual environment (VE) is carried out via a dedicated application or via a scan of the corresponding real environment (RE).

3. The method according to claim 1, wherein the method comprises obtaining at least one piece of data relating to at least one object, real (25, 26, 27, 28, 29) or virtual (41, 42, 43, 44), and displaying by the user equipment (20) the at least one piece of data on or next to said object in the video stream.

4. The method according to claim 1, comprising detecting a real object (25, 26, 27, 28, 29) added or moved in the real environment (RE), determining the real position of the real object (25, 26, 27, 28, 29) added or moved relative to the predetermined reference position, determining the virtual position of the real object (25, 26, 27, 28, 29) added or moved corresponding to the determined real position and updating the virtual environment (VE) from the determined virtual position of the virtual object (41, 42, 43, 44).

5. The method according to claim 4, wherein the detection of the real object added or moved in the real environment (RE) is carried out using an artificial intelligence module to link the object to a pre-existing 3D object model in the 3D model of the environment, or a QR code on the object, or a scan of the object to create the 3D model of the object live.

6. The method according to claim 4, wherein obtaining the position of the real object (25, 26, 27, 28, 29) added or moved is carried out by a geolocation module or by creation of a new marker.

7. A non-transitory computer-readable storage medium having a computer program product stored thereon characterized in that it comprises a set of program code instructions which, when executed by one or more processors of a computer, lead the one or more processors to implement a method according to claim 1.

8. A user equipment (20) for real-time integration of at least one virtual object (41, 42, 43, 44) in a video stream generated by said user equipment (20) and representing a real environment (RE), said virtual object (41, 42, 43, 44) being defined in a virtual environment (VE) and being characterized by its so-called "virtual" position, said virtual position being defined in relation to a virtual marker (30) placed in said virtual environment (VE), the user equipment (20) being configured to:
in a preliminary phase:
generate a 3D model representing the virtual environment (VE),
place a virtual marker (30) in the generated virtual environment (VE),
generate at least one image of the real environment (RE) corresponding to the virtual environment (VE) and comprising a real marker (10) at the location corresponding to that of the virtual marker (30) in the virtual environment (VE),
detect a pattern corresponding to at least part of the real marker (10) in the at least one image generated in order to locate the real marker (10), the pattern being predefined in the application,
determine the position of the detected pattern as the reference position of the real environment (RE),
map the real environment (ER) by automatically creating additional markers from the real marker (10),
the user equipment being further configured to:
calculate the so-called "real" position, in the real environment (RE), of a representation of the at least one virtual object (41, 42, 43, 44) relative to the corresponding predetermined reference position, in the real environment (RE), at the position of the virtual marker in the virtual environment (VE),
integrate the representation of the at least one virtual object (41, 42, 43, 44) into a video stream generated at the calculated real position,
display the video stream so that said representation appears in real time on images of the video stream generated at an actual calculated position.

9. The user equipment (20) according to claim 8, said user equipment (20) being configured to receive at least one piece of data relating to at least one real object (25, 26, 27, 28, 29) or virtual (41, 42, 43, 44), and to display the at least one piece of data on or next to said object in the video stream.

10. The user equipment (20) according to claim 8, said user equipment (20) being configured to detect an object added or moved in the real environment (RE), to determine the real position of the added or moved object relative to the predetermined reference position, to determine the virtual position of the added or moved object corresponding to the determined real position and to update the virtual environment (VE) from the determined virtual position of the virtual object (41, 42, 43, 44).

11. The user equipment (20) according to claim 10, said user equipment (20) being configured to detect the object added or moved in the real environment (RE) using a code placed on the object, or by scanning the object to create a 3D model of the object live.

12. An augmented reality system (1) comprising at least one real marker (10) arranged in a real environment (RE) and user equipment (20) according to claim 8.

* * * * *